United States Patent [19]

Shinmi

[11] Patent Number: 4,569,870
[45] Date of Patent: Feb. 11, 1986

[54] JOINTED, REINFORCED, ELASTOMER-COATED FABRIC MATERIAL

[75] Inventor: Hideo Shinmi, Ichihara, Japan

[73] Assignee: Toray Silicone Company, Ltd., Tokyo, Japan

[21] Appl. No.: 614,000

[22] Filed: May 23, 1984

[30] Foreign Application Priority Data

Jun. 6, 1983 [JP] Japan .................................. 83-99509
Jun. 6, 1983 [JP] Japan .................................. 83-99511

[51] Int. Cl.$^4$ .............................................. B32B 3/06
[52] U.S. Cl. ...................... 428/57; 428/104; 428/246; 428/251; 428/253; 428/266; 156/92
[58] Field of Search .............. 428/57, 129, 104, 246, 428/251, 253, 266; 156/93, 92

[56] References Cited

U.S. PATENT DOCUMENTS

| | | | |
|---|---|---|---|
| 2,399,973 | 5/1946 | Albin | 428/104 |
| 4,192,116 | 3/1980 | Kelly | 428/61 X |
| 4,303,712 | 12/1981 | Woodruff | |
| 4,530,868 | 7/1985 | Shinmi et al. | 428/57 |

Primary Examiner—Alexander S. Thomas
Attorney, Agent, or Firm—Edward C. Elliott

[57] ABSTRACT

A jointed watertight, airtight, elastomer-coated material is described. The material consists essentially of a first elastomer-coated fabric material and a second elastomer-coated fabric material, said second material being overlaid at an edge over an edge of the first material. The overlaid portion of each material is laminated to the other with a pressure-sensitive adhesive intercalated between the two materials. The laminated portion is further bound with a fastener which penetrates across the laminated portion in an up-and-down manner. Typical fasteners are thread, rivets, or bolts. The jointed material can be further bound by a tacky tape which is adhered on the bound portion of one material and the unbound portion of the other material, covering the joint between the edges of the two materials. The jointed waterproof, airtight, elastomer-coated fabric material is particularly useful for air-supported structures.

8 Claims, 5 Drawing Figures

JOINTED, REINFORCED, ELASTOMER-COATED FABRIC MATERIAL

BACKGROUND OF THE INVENTION

1. Field of the Invention

This invention is related to jointed elastomer-coated fabric material such as is used as roofing material for large structures.

2. Background Information

Elastomer-coated fabric has conventionally been used as a waterproof fabric, for diving suits, as belts and as a fireproof curtain and it has recently been proposed as a roofing material for stadiums, gymnasiums and outdoor restaurants.

In U.S. Pat. No. 4,192,116, issued Mar. 11, 1980, to Kelly, a method of joining adjacent cured rubber membranes for use in a roof construction is taught. The lapping ends of the cured rubber membranes are sealed together with cement or the like, then an additional sealing means is provided. A composite structure comprising a lower uncured gum rubber strip and a cured reinforced rubber is applied over the seam and caused to be adhered to both portions of both of the overlapping membranes.

In U.S. Pat. No. 4,303,712, issued Dec. 1, 1981, to Woodroof, a fabric elastomer composite useful for various garments is described. The composite is a relatively thin elastomer membrane having a stretchable fabric joined thereto. He illustrates various methods of forming water tight joints in which adjacent pieces are sewn together. The sewn joint is then covered with a fabric elastomer strip which is bonded to the pieces of composite on each side of the sewn joint by means of a bead of room temperature vulcanizing silicone rubber applied between the composite and the fabric elastomer strip.

It is difficult to manufacture elastomer-coated cloth with a large surface area. However, because large surface areas are required when elastomer-coated cloths are to be used for building roofing materials and for large-scale tent materials, numerous pieces with a comparatively small surface area as manufactured in the factory must be joined.

To join one fabric with another fabric, the edges of the fabrics are overlaid on each other and then sewn by the usual method. This method is generally satisfactory for the production of jointed materials with small areas. However, when the fabrics are to be joined together with each other in order to manufacture a large roofing substitute for a building or large-scale tenting, this method in which only the edges of the fabrics are overlaid on each other and then sewn suffers drawbacks such as low strength and poor watertightness. The tensile stresses generated by gravity and wind pressure will concentrate in the vicinity of the sewn thread with a resulting ready rupture in this region. Also, rainwater and dust will infiltrate through this gap in the overlaid region.

The purpose of this invention is to eliminate the above-mentioned drawbacks and to provide a jointed elastomer-coated fabric material which exhibits high strength, excellent watertightness, and excellent airtightness.

SUMMARY OF THE INVENTION

The jointed, watertight, airtight, elastomer-coated fabric material of this invention is characterized by laminating the edges of adjacent elastomer-coated fabrics on each other using a pressure-sensitive adhesive which has been placed between the edges and binding the laminated segments with a fastener which penetrates the cross section of the laminated segments in an up-and-down manner.

The jointed elastomer-coated fabric material of this invention can be further improved by a means in which a tacky tape is adhered on the bound region of one elastomer-coated fabric and the unbound region of the other elastomer-coated fabric, covering the joint between the edges of the two elastomer-coated fabrics.

DESCRIPTION OF THE INVENTION

Figure 1:
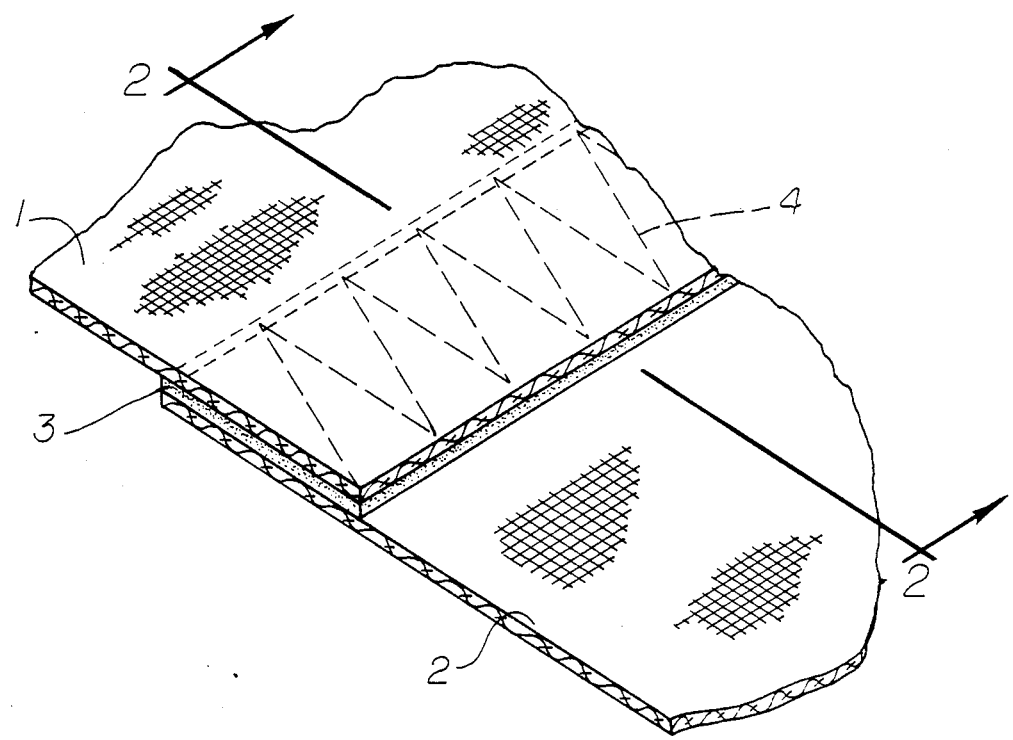
FIG. 1 is an oblique view of the relevant segment of an elastomer-coated fabric joined material of this invention.

This invention relates to a jointed, watertight, airtight, elastomer-coated fabric material consisting essentially of a first elastomer-coated fabric material and a second elastomer-coated fabric material, said second elastomer-coated fabric material being overlaid at an edge over an edge of the first elastomer-coated fabric material, the overlaid portion of each material being laminated to the other with pressure-sensitive adhesive intercalated between the two materials with the laminated portions of each material being further bound with a fastener which penetrates the cross section of the laminated portion in an up-and-down manner.

This invention also relates to an embodiment in which a tacky tape is adhered on the bound portion of one elastomer-coated fabric material and the unbound portion of the other elastomer-coated fabric material, covering the joint between the edges of the two elastomer-coated fabric materials.

Any elastomer-coated fabric may be used by the method of this invention as long as an elastomer is coated on the fabric and the elastomer is integral with the fabric. The elastomer component of the elastomer-coated fabric may be selected from among natural rubber, synthetic rubbers, and thermoplastic elastomers. Applicable synthetic rubbers include SBR, NBR, EPR, EPDM, chloroprene rubber, acrylic rubber, and silicone rubber. Synthetic rubbers and particularly silicone rubbers are preferred for a large-area jointed material which will be used outdoors. Applicable silicone rubbers are organic peroxide-vulcanizing types, addition reaction curing types, and room temperature-curing types. Furthermore, the surface of the silicone rubber may additionally be integrally laminated with a thin layer of silicone resin.

The fabric component of the elastomer-coated fabric may be selected from among weaves, knits, nonwoven fabrics, meshes, and their laminates. Fibers which constitute this fabric include natural fibers, semi-synthetic fibers, synthetic fibers, and inorganic fibers. A weatherresistant synthetic fiber fabric such as a polyester fiber fabric or inorganic fiber fabric (glass fiber fabric or metal fiber fabric) is preferred for the manufacture of a large-area jointed material which is to be used outdoors. When producing the shell for a gymnasium, stadium, tennis court, or outdoor restaurant wherein natural light is to be utilized, that is, in the manufacture of the membrane for an air-membrane structure, a fabric of a highly light-transmissive fiber or a weave or knit with small interfiber gaps is preferred.

The shape, thickness and size (area) of the elastomer-coated fabric are all arbitrary. The planar configuration may be square, rectangular, triangular, or trapezoidal. The thickness is preferably 0.1 to 5 mm. The applicable plane surface area is preferably 100 cm$^2$ to 50 m$^2$.

The method for fastening and uniting the laminated segments of the edges of the elastomer-coated fabrics is to sew with thread as the fastener or to join by clamping with rivets or bolts.

The thread for sewing must have a tenacity equal to or greater than the tenacity of the fiber or yarn which is used in the elastomer-coated fabric and, in addition, is preferably flexible. Examples of such thread are glass fiber cord, carbon fiber thread, synthetic fiber thread, and metal cord constituted of a large number of twisted thin wires. Glass fiber thread, carbon fiber thread, and metal fiber thread constituted of a large number of twisted thin wires are preferred for sewing from the standpoints of strength and durability.

The pressure-sensitive adhesive agent which is intercalated between the edges of the elastomer-coated fabrics may be a cured or uncured system; however, a cured system is preferred. It may be a solventless type, solution, or hot melt. Examples of these pressure-sensitive adhesives are vinyl, rubber, acrylic, and silicone pressure-sensitive adhesives which exhibit high adhesive strength. A silicone pressure-sensitive adhesive is preferred in the manufacture of a large-area jointed material for outdoor applications.

The tacky tape comprises a layer of a tack agent on one surface of a tape. Preferred examples of the tape backing are plastic film tapes such as polytetrafluoroethylene film tape, polyester film tape, and polypropylene film tape; varnish-impregnated tapes such as silicone varnish-impregnated glass fabric tape and elastomer-coated fabric tapes such as silicone elastomer-coated glass fabric tape. A polytetrafluoroethylene film tape carrying a silicone tack agent and an inorganic fiber fabric tape coated with a cured silicone material and overcoated with a silicone tack agent are preferred for the production of a large-area jointed material for outdoor applications.

The tack agent component of the tacky tape must have a high tack and is preferably a rubber, vinyl, acrylic, or silicone tack agent. In particular, a silicone tack agent is preferred in the manufacture of a large-area jointed material for outdoor applications.

The jointed, watertight, airtight, elastomer-coated fabric material of this invention will be explained using illustrative diagrams.

Figure 2:
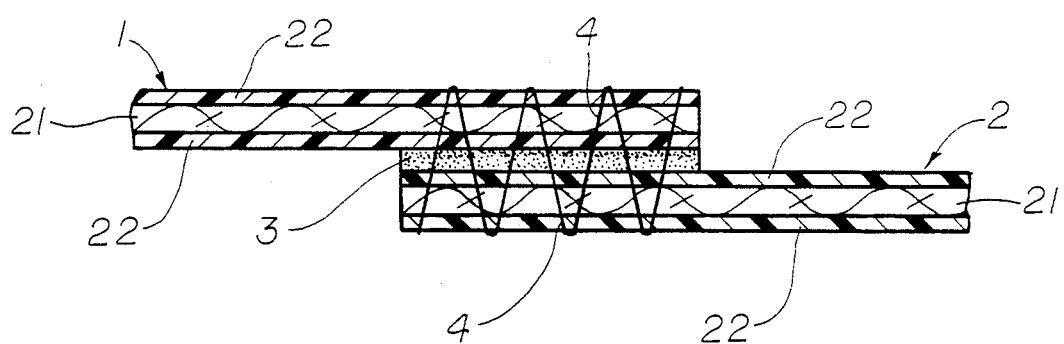
FIG. 2 is a cross section of FIG. 1.

FIGS. 1 and 2 depict a jointed, watertight, airtight, elastomer-coated fabric material which has been produced by this invention. 1 represents a first elastomer-coated fabric and 2 represents a second elastomer-coated fabric. The two elastomer-coated fabrics 1 and 2 are constituted, respectively, of internal fabric 21 (such as the knit discussed above) whose exteriors are coated with elastomer 22 to form airtight sheets. The edges of elastomer-coated fabrics 1 and 2 are overlaid on and adhered to each other with pressure-sensitive adhesive 3 which is intercalated between the edges, and the laminated segments are then sewn with thread 4, in a line which zigzags in a plane, with the thread penetrating the cross section in an up-and-down manner.

Figure 3:
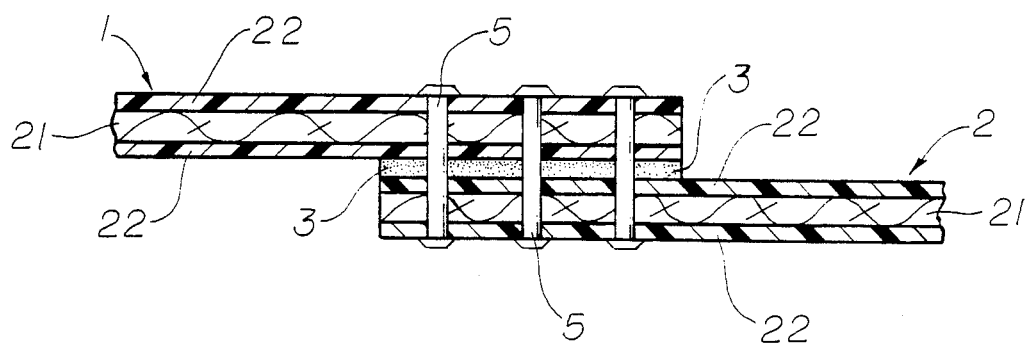
FIG. 3 is a cross section of a joined material using rivets as the fasteners.

As demonstrated in FIG. 3, the laminated segments can be fastened with rivets 5 instead of the sewing thread 4 used in the above example. Alternatively, bolt-nut combinations which exhibit a function identical to the function of rivets 5 may be employed for joining by clamping.

The above jointed elastomer-coated fabric material is characterized by laminating the edges of adjacent elastomer-coated fabrics to each other using a pressure-sensitive adhesive which has been intercalated between the edges and the resulting laminated segments are then joined with a fastener such as sewing thread, rivets, or bolts. Thus, when the laminated segments of the elastomer-coated fabrics are to be joined, the laminated segments are fixed with the pressure-sensitive adhesive, resulting in a facile jointing operation with the fastener. Furthermore, the joint strength and the integrity of the gap between the two elastomer-coated fabrics against rainwater or dust are simultaneously improved.

Figure 4:
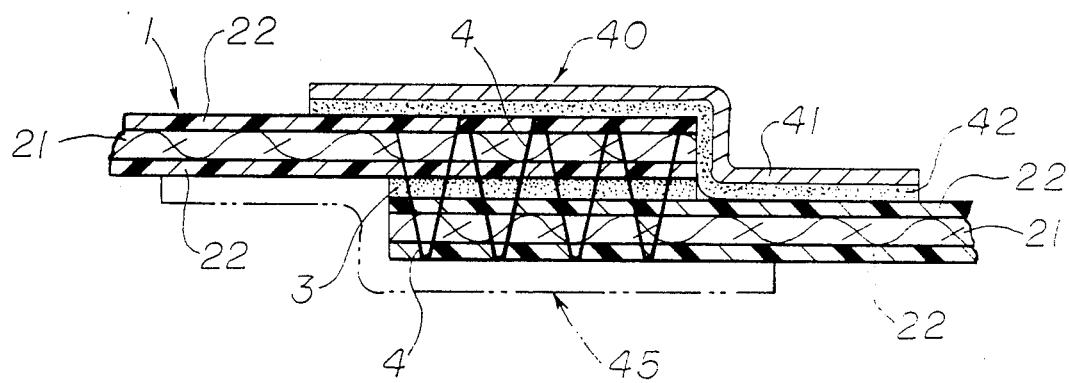
FIG. 4 is a cross section of a joined material as in FIG. 2 in which tacky tape has been adhered over the bound region.

As demonstrated in FIG. 4, the jointed, watertight, airtight, elastomer-coated fabric material of FIG. 2 is further improved by a tacky tape 40. At these overlaid and jointed segments of the edges, a tacky tape 40 is adhered over the surface of the jointed region of elastomer-coated fabric 1 and the unjointed surface of elastomer-coated fabric 2. The tacky tape 40 is composed of tack agent 42 coated on one surface of tape backing 41 and the tack agent 42 side is adhered on the above-mentioned elastomer-coated fabrics 1 and 2.

As demonstrated by the chain line 45 in FIG. 4, the tacky tape adhered on the surfaces of the two elastomer-coated fabrics 1 and 2 may also additionally be adhered on the reverse surfaces wherein a tacky tape 45 would be adhered over the jointed region of elastomer-coated fabric 2 and the unjointed region of elastomer-coated fabric 1. When both surfaces are adhered with tacky tapes 40 and 45, respectively, the resulting joint exhibits an increase in strength, watertightness, and airtightness.

Figure 5:
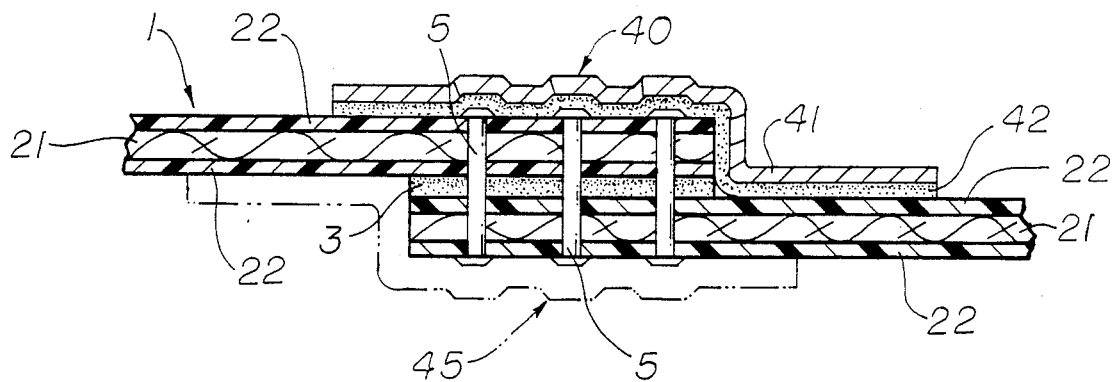
FIG. 5 is a cross section of a joined material as in FIG. 3 in which tacky tape has been adhered over the bound region.

As demonstrated in FIG. 5, the laminated segments can be fastened with rivets 5 instead of the sewing thread 4 used in FIG. 4. Alternatively, bolt-nut combinations which exhibit a function identical to the function of rivets 5 may be employed for joining by clamping. When rivets or bolts are employed, their heads must be flat so as not to provide a hindrance to adhering tacky tapes 40 and 45.

The above examples depicts cases in which adjacent elastomer-coated fabrics have been jointed with each other sheet by sheet; however, the end regions of several elastomer-coated fabrics may be simultaneously and alternately overlaid on each other in order to repeat the above structure for use as the roof of a building or for large-scale tenting. On the other hand, the edges of elastomer-coated fabrics may be folded back to form hooks and the resulting hook-like fold-backs of the two fabrics can be hooked and laminated.

As shown in FIGS. 4 and 5, a tight joint and seal are achieved and, furthermore, a tacky tape has been adhered over the joint region of one elastomer-coated fabric and the unjointed region of the other elastomer-coated fabric, the joint strength and sealability being further increased. For this reason, the resulting material will maintain its original watertightness and airtightness even when the tacky tape is peeled off.

The jointed elastomer-coated fabric material of this invention is watertight and airtight, making it particularly useful for the construction of air-supported structures. The elastomer-coated fabric can be made with high light transmission so that such structures can be naturally lighted.

The following examples are included for illustrative purposes only and should not be construed as limiting the invention which is properly set forth in the appended claims.

EXAMPLE 1

A transparent, addition reaction-curable liquid silicone rubber (SE6705 from Toray Silicone Co., Ltd.) was coated by impregnation on both surfaces of a plain glass fiber fabric [width 1.0 m, length 5.0 m, thickness 0.35 mm, glass cord diameter 1.0 mm, 5.5 glass cords/cm (width), Glasslon Cross MG 3000-1NH·30 from Asahi Glass Fiber Co., Ltd.] and then cured at an elevated temperature. Two sheets of a silicone rubber-coated glass fabric (total thickness 0.75 mm) were thus prepared. A silicone pressure-sensitive adhesive (SH4280 Toray Silicone Co., Ltd., solids 60 wt %) was uniformly coated to a final thickness of 80 to 100 micrometres on one of the five meter edges of one fabric (to a 5 cm width) and then air-dried at room temperature for greater than 30 minutes. The resulting coated edge was laminated with one of the five meter edges of the other fabric (to a width of 5 cm). The resulting laminated portion was pressed back-and-forth with a hand roller weighing about 2.5 kg. The two fabrics were tightly joined with each other and no slippage occurred in the attempt to pull them apart manually.

The laminated segments were then sewn in a zigzag line with 1.0 mm diameter glass fiber thread. The resulting silicone rubber-coated glass fabric jointed material was light transmissive and the two silicone rubber-coated glass fabrics were tightly joined to each other. When water was sprayed on the joint region, it did not penetrate to the opposite side. The jointed material did not undergo any change upon exposure outdoors.

For comparison examples, jointed materials were manufactured, respectively, in which only sewing was conducted and in which only a tacky tape was applied. When water was sprayed on the line of the joint which had only been sewn, water penetrated to the opposite side.

When the glass fabrics to which only a tacky tape had been applied were forcefully pulled in opposite directions, they were peeled from each other.

EXAMPLE 2

A silicone rubber-coated glass fabric jointed material was manufactured by the method of Example 1 with the exceptions that the silicone pressure-sensitive adhesive DX38-052 (experimental adhesive from Toray Silicone Co., Ltd., solids 60 wt %) was used instead of the pressure-sensitive adhesive SH4280 used in Example 1 and adhesion was accomplished by curing at room temperature for 12 hours.

The two fabrics in the intermediate stage in which the laminated segments had been joined with only the pressure-sensitive adhesive were well adhered to each other. Neither slippage nor peeling occurred under the application of manual force. When water was sprayed on the joint line of the material which had been sewn with thread, the water did not penetrate to the opposite side. The jointed material did not undergo any change after exposure outdoors.

EXAMPLE 3

A silicone rubber-coated glass fabric jointed elastomer-coated fabric material was prepared as in Example 1. Then a tacky tape (thickness of SH4280 layer 20 micrometres, thickness of polytetrafluoroethylene film tape 50 micrometres, width 6.0 cm) in which a silicone pressure-sensitive adhesive (SH4280 from Toray Silicone Co., Ltd.) had been coated on one surface of a polytetrafluoroethylene film tape was adhered on one surface of the joint to extend from the joint 3 cm onto the surface of the unsewn region of the adjacent fabric as well as 1 cm beyond the joint in the opposite direction on the surface of the fabric constituting the taped surface of the joint so as to bring the pressure-sensitive adhesive into contact with the silicone rubber-coated glass fiber fabric.

The resulting silicone rubber-coated glass fabric jointed material was light transmissive and the two silicone rubber-coated glass fabrics were tightly joined to each other. When water was sprayed on the joint region, it did not penetrate to the opposite side. The jointed material did not undergo any change upon exposure outdoors.

EXAMPLE 4

A silicone rubber-coated glass fabric jointed elastomer-coated fabric material was manufactured by the method of Example 3 with the exception that the silicone pressure-sensitive adhesive of Example 2 was used instead of the SH4280 used in Example 3 and adhesion was accomplished by curing at room temperature for 12 hours.

When water was sprayed on the line of the jointed material which had been sewn with thread and then adhered with a tacky tape, the water did not penetrate to the opposite side. The jointed material did not undergo any change after exposure outdoors.

That which is claimed is:

1. A jointed, watertight, airtight, elastomer-coated fabric material useful as a membrane for an air-membrane structure consisting essentially of a first elastomer-coated fabric material and a second elastomer-coated fabric material, said second elastomer-coated fabric material being overlaid at an edge over an edge of the first elastomer-coated fabric material, the overlaid portion of each material being laminated to the other with pressure-sensitive adhesive intercalated between the two materials with the laminated portions of each material being further bound with a fastener which penetrates the cross section of the laminated portion in an up-and-down manner, said jointed material having improved tensile strength.

2. The jointed, watertight, airtight elastomer-coated fabric material of claim 1 in which a tacky tape is adhered on the bound portion of one elastomer-coated fabric material and the unbound portion of the other elastomer-coated fabric material, covering the joint between the edges of the two elastomer-coated fabric materials.

3. The jointed elastomer-coated fabric material described in claim 2 with the further specification that the tacky tape is a polytetrafluoroethylene film tape coated with a silicone tack agent or an inorganic fiber fabric tape coated with a cured silicone material and overcoated with a silicone tack agent.

4. The jointed elastomer-coated fabric material described in claim 4 with the further specification that the pressure-sensitive adhesive is a vinyl, rubber, acrylic, or silicone pressure-sensitive adhesive.

5. The jointed elastomer-coated fabric material described in claim 2 with the further specification that the elastomer-coated fabric material is a silicone rubber-coated glass fiber fabric or silicone-rubber coated metal fiber fabric, that the tacky tape is a polytetrafluoroethylene film tape or an inorganic fiber fabric tape coated with a cured silicone material, the tacky tape having a silicone tack agent, and the pressure-sensitive adhesive is a silicone pressure-sensitive adhesive.

6. The jointed elastomer-coated fabric material described in claim 1 with the further specification that the elastomer-coated fabric is a silicone rubber-coated glass fiber fabric or a silicone rubber-coated metal fiber fabric.

7. A process of producing a jointed, watertight, airtight, elastomer-coated fabric material, useful as a membrane for an air-membrane structure consisting essentially of (A) coating at least one edge of each of at least a first elastomer-coated fabric material and a second elastomer-coated fabric material with pressure-sensitive adhesive, then (B) overlaying the coated edge of at least the first elastomer-coated fabric over the uncoated edge of the second elastomer-coated fabric and adhering the overlapped edges together by pressure, then (C) further binding the laminated portions of each material together with a fastener which penetrates the cross section of the laminated portion in an up-and-down manner, to produce a jointed material having improved tensile strength.

8. The process of claim 7 in which a tacky tape is adhered on the bound portion of one elastomer-coated fabric material and the unbound portion of the other elastomer-coated fabric material to cover the joint between the edges of the two elastomer-coated fabric materials.

* * * * *

UNITED STATES PATENT AND TRADEMARK OFFICE
CERTIFICATE OF CORRECTION

PATENT NO. : 4,569,870
DATED : February 11, 1986
INVENTOR(S) : Hideo Shinmi

It is certified that error appears in the above-identified patent and that said Letters Patent is hereby corrected as shown below:

In Column 7, line 4; the words "claim 4" should read "claim 3".

Signed and Sealed this

Eighteenth Day of November, 1986

Attest:

DONALD J. QUIGG

*Attesting Officer*   *Commissioner of Patents and Trademarks*